(12) United States Patent
Yu (10) Patent No.: US 12,014,033 B2
(45) Date of Patent: Jun. 18, 2024

(54) INFORMATION PRESENTATION METHOD AND APPARATUS, AND ELECTRONIC DEVICE AND STORAGE MEDIUM

(71) Applicant: Beijing Zitiao Network Technology Co., Ltd., Beijing (CN)

(72) Inventor: Qin Yu, Beijing (CN)

(73) Assignee: Beijing Zitiao Network Technology Co., Ltd. (CN)

( * ) Notice: Subject to any disclaimer, the term of this patent is extended or adjusted under 35 U.S.C. 154(b) by 0 days.

(21) Appl. No.: 18/389,734

(22) Filed: Dec. 19, 2023

(65) Prior Publication Data
US 2024/0126415 A1   Apr. 18, 2024

Related U.S. Application Data

(63) Continuation of application No. PCT/CN2022/115416, filed on Aug. 29, 2022.

(51) Int. Cl.
*G06F 3/0484* (2022.01)
*G06F 3/0481* (2022.01)

(52) U.S. Cl.
CPC .......... *G06F 3/0484* (2013.01); *G06F 3/0481* (2013.01)

(58) Field of Classification Search
CPC .... G06F 3/0484; G06F 3/0481; G06F 3/0482; G06F 3/04842
See application file for complete search history.

(56) References Cited

U.S. PATENT DOCUMENTS

| 9,583,142 B1* | 2/2017 | Zhu ................... H04N 21/8173 |
| 2016/0283020 A1 | 9/2016 | Heo et al. |
| 2017/0185669 A1 | 6/2017 | Chang et al. |
| 2020/0160405 A1 | 5/2020 | Eatedali |
| 2021/0012761 A1 | 1/2021 | Song |

(Continued)

FOREIGN PATENT DOCUMENTS

| CN | 107122181 A | 9/2017 |
| CN | 108476259 A | 8/2018 |

(Continued)

OTHER PUBLICATIONS

Andrei Serbanoiu et al., Relevance-Based Ranking of Video Comments on YouTube, May 1, 2013, International Conference on Control Systems and Computer Science, pp. 225-231 (Year: 2013).*

(Continued)

*Primary Examiner* — Tam T Tran (57) ABSTRACT

An information presentation method and apparatus, and an electronic device and a storage medium. The method comprises: in response to an operation, which is triggered by a user, for presenting a display interface of second interaction content associated with a target video, determining whether first interaction content associated with the target video meets a preset condition; and in response to the first interaction content associated with the target video meets the preset condition, presenting a control of the first interaction content in the display interface of the second interaction content associated with the target video, wherein the first interaction content is obtained by performing a first interaction operation on the target video, and the second interaction content is obtained by performing a second interaction operation on the target video.

20 Claims, 9 Drawing Sheets

(56) References Cited

U.S. PATENT DOCUMENTS

| | | | |
|---|---|---|---|
| 2022/0068313 A1* | 3/2022 | Shafir Nir | G06V 20/48 |
| 2022/0312065 A1 | 9/2022 | Han et al. | |
| 2022/0391060 A1 | 12/2022 | Han | |
| 2022/0417566 A1* | 12/2022 | Tang | H04N 21/4312 |

FOREIGN PATENT DOCUMENTS

| | | |
|---|---|---|
| CN | 108600825 A | 9/2018 |
| CN | 109005352 A | 12/2018 |
| CN | 109862412 A | 6/2019 |
| CN | 110083282 A | 8/2019 |
| CN | 110134479 A | 8/2019 |
| CN | 110602394 A | 12/2019 |
| CN | 111291200 A | 6/2020 |
| CN | 111339326 A | 6/2020 |
| CN | 112261459 A | 1/2021 |
| CN | 113055709 A | 6/2021 |
| CN | 113065008 A | 7/2021 |
| CN | 113286197 A | 8/2021 |
| CN | 113721807 A | 11/2021 |

OTHER PUBLICATIONS

Bo-Wen Hsieh et al., Video Summarization of Timestamp Comments Videos based on Concept of Folksonomy, Nov. 1, 2015, IEEE Explore, pp. 193-198 (Year: 2015).*
First Office Action dated Nov. 3, 2022 in CN Appl. No. 202111004405.9, English translation (19 pages).
Second Office Action dated Feb. 3, 2023 in CN Appl. No. 202111004405.9, English translation (20 pages).
Third Office Action dated Apr. 29, 2023 in CN Appl. No. 202111004405.9, English translation (19 pages).
International Search Report dated Nov. 25, 2022 in PCT Appl. No. PCT/CN2022/115416, English translation (8 pages).
International Written Opinion dated Nov. 25, 2022 in PCT Appl. No. PCT/CN2022/115416, English translation (6 pages).
How to set the original sound of Kuaishou works, Intern Editor for installation world, May 11, 2019, English translation (8 pages).

* cited by examiner

INFORMATION PRESENTATION METHOD AND APPARATUS, AND ELECTRONIC DEVICE AND STORAGE MEDIUM

CROSS REFERENCE TO RELATED APPLICATION

The present application is based on and claims the benefit of the priority of the International Patent Application No. PCT/CN2022/115416 and the Chinese Patent Application No. 202111004405.9 entitled "INFORMATION PRESENTATION METHOD AND APPARATUS, AND ELECTRONIC DEVICE AND STORAGE MEDIUM" filed on Aug. 30, 2021, the entire content of both of which is incorporated herein by reference.

TECHNICAL FIELD

The present disclosure relates to the field of information technology, and in particular, to an information presentation method and apparatus, and an electronic device and a storage medium.

BACKGROUND

With the rapid development of terminal technology and network technology, current video applications usually have functions such as posting works. A user may create through the video applications to post brilliant content.

SUMMARY

In one aspect, an embodiment of the present disclosure provides an information presentation method, including:
  in response to an operation, which is triggered by a user, for presenting a display interface of second interaction content associated with a target video, determining whether first interaction content associated with the target video meets a preset condition; and
  in response to the first interaction content associated with the target video meeting the preset condition, presenting a control of the first interaction content in the display interface of the second interaction content associated with the target video, wherein the first interaction content is obtained by performing a first interaction operation on the target video, and the second interaction content is obtained by performing a second interaction operation on the target video.

In another aspect, an embodiment of the present disclosure further provides an information presentation apparatus, including:
  a first determination module configured to, in response to an operation, which is triggered by a user, for presenting a display interface of second interaction content associated with a target video, determine whether first interaction content associated with the target video meets a preset condition; and
  a first presentation module configured to, in response to the first interaction content associated with the target video meeting the preset condition, present a control of the first interaction content in the display interface of the second interaction content associated with the target video,
  wherein the first interaction content is obtained by performing a first interaction operation on the target video, and the second interaction content is obtained by performing a second interaction operation on the target video.

In another aspect, an embodiment of the present disclosure further provides an electronic device, including:
  one or more processors; and
  a storage means configured to store one or more programs,
  wherein the one or more programs, when executed by the one or more processors, cause the one or more processors to implement the information presentation method as described above.

In another aspect, an embodiment of the present disclosure further provides a computer-readable storage medium having thereon stored a computer program which, when executed by a processor, implements the information presentation method as described above.

BRIEF DESCRIPTION OF THE DRAWINGS

The above and other features, advantages, and aspects of the embodiments of the present disclosure will become more apparent in conjunction with the accompanying drawings and with reference to the following detailed description. Throughout the drawings, identical or similar reference numbers refer to identical or similar elements. It should be understood that the drawings are schematic and that components and elements are not necessarily drawn to scale.

DETAILED DESCRIPTION

The embodiments of the present disclosure will be described in more detail below with reference to the accompanying drawings. While certain embodiments of the present disclosure are shown in the drawings, it should be understood that the present disclosure may be implemented in various forms and should not be construed as limited to the embodiments set forth herein, which are provided for a more complete and thorough understanding of the present disclosure instead. It should be understood that the drawings and the embodiments of the present disclosure are for exemplary purposes only and are not intended to limit the scope of protection of the present disclosure.

It should be understood that various steps recited in method implementations of the present disclosure may be performed in a different order, and/or performed in parallel. Moreover, the method implementations may include additional steps and/or omit performing the illustrated steps. The scope of the present disclosure is not limited in this respect.

The term "including" and variations thereof used herein is intended to be open-ended, i.e., "including but not limited to". The term "based on" is "at least partially based on". The term "one embodiment" means "at least one embodiment"; the term "another embodiment" means "at least one other embodiment"; and the term "some embodiments" means "at least some embodiments". Definitions related to other terms will be given in the following description.

It should be noted that the concepts "first", "second", and the like mentioned in the present disclosure are only used for distinguishing different devices, modules or units, and are not used for limiting the order or interdependence of functions performed by the devices, modules or units.

It should be noted that modifications of "a", "an" or "a plurality" mentioned in this disclosure are intended to be illustrative rather than restrictive, and that those skilled in the art should appreciate that they should be understood as "one or more" unless otherwise explicitly stated in the context.

Names of messages or information exchanged between a plurality of devices in the embodiments of the present disclosure are for illustrative purposes only, and are not intended to limit the scope of the messages or information.

Figure 1:
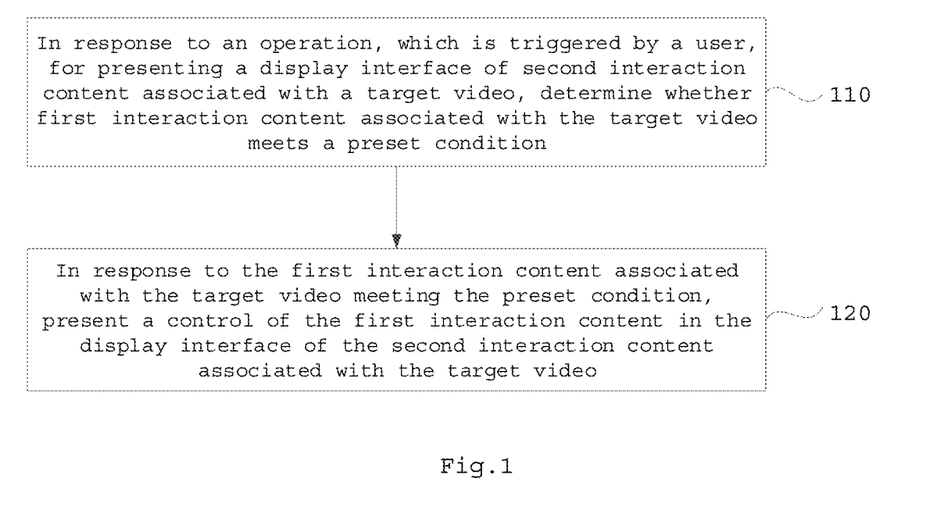
FIG. 1 is a flow diagram of an information presentation method in an embodiment of the present disclosure.

FIG. 1 is a flow diagram of an information presentation method in an embodiment of the present disclosure. The method may be executed by an information presentation apparatus, wherein the apparatus may be implemented in software and/or hardware, and the apparatus may be provided in an electronic device, such as a display terminal, specifically including but not limited to an electronic device with a display screen, such as a smart phone, a palm computer, a tablet computer, a portable wearable device, and a smart home device (e.g., a desk lamp).

As shown in FIG. 1, the method may specifically include the following steps:
  step 110, in response to an operation, which is triggered by a user, for presenting a display interface of second interaction content associated with a target video, determining whether first interaction content associated with the target video meets a preset condition;
  step 120, in response to the first interaction content associated with the target video meeting the preset condition, presenting a control of the first interaction content in the display interface of the second interaction content associated with the target video;
  wherein, the first interaction content is obtained by performing a first interaction operation on the target video, and the second interaction content is obtained by performing a second interaction operation on the target video.

Figure 2:
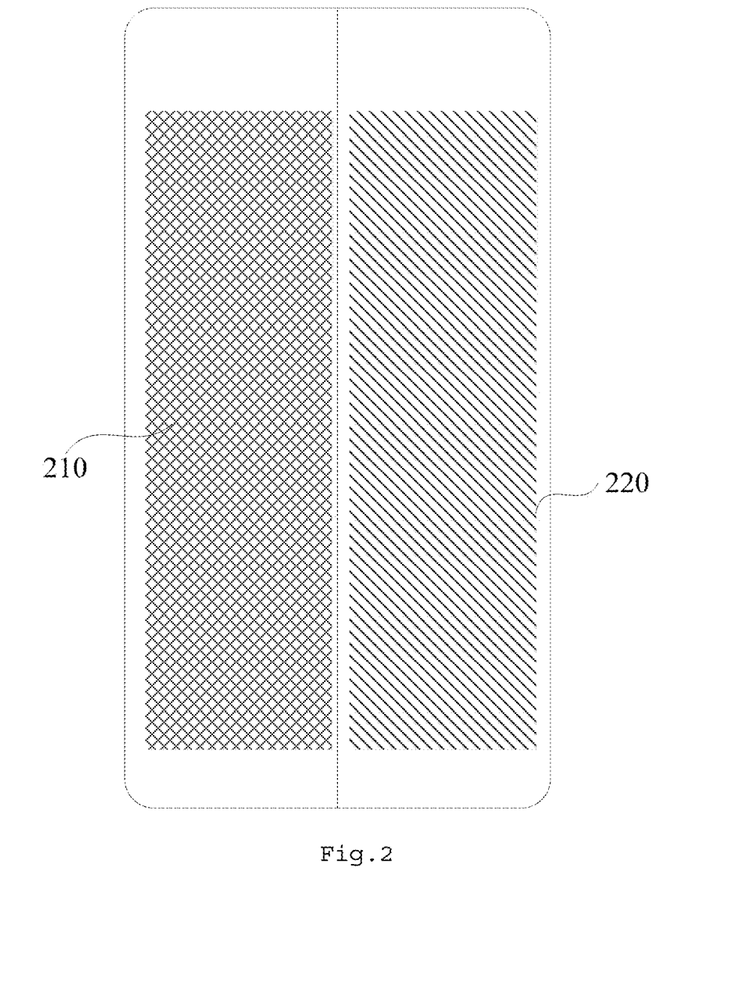
FIG. 2 is a schematic interface diagram of a duetted video in an embodiment of the present disclosure.

Exemplarily, the first interaction operation is duetting, and the first interaction content is a duetted video obtained by duetting with the target video. Further, the duetted video includes the target video to be duetted and a real-time video shot by the user, as shown in FIG. 2 which is a schematic interface diagram of a duetted video, where a target video 210 and a real-time video 220 shot by a user are included. The same target video may be used by a plurality of users for duetting, that is, target videos included in a plurality of duetted videos might be the same one, but real-time videos shot by the users might be ever-changing.

Figure 3:
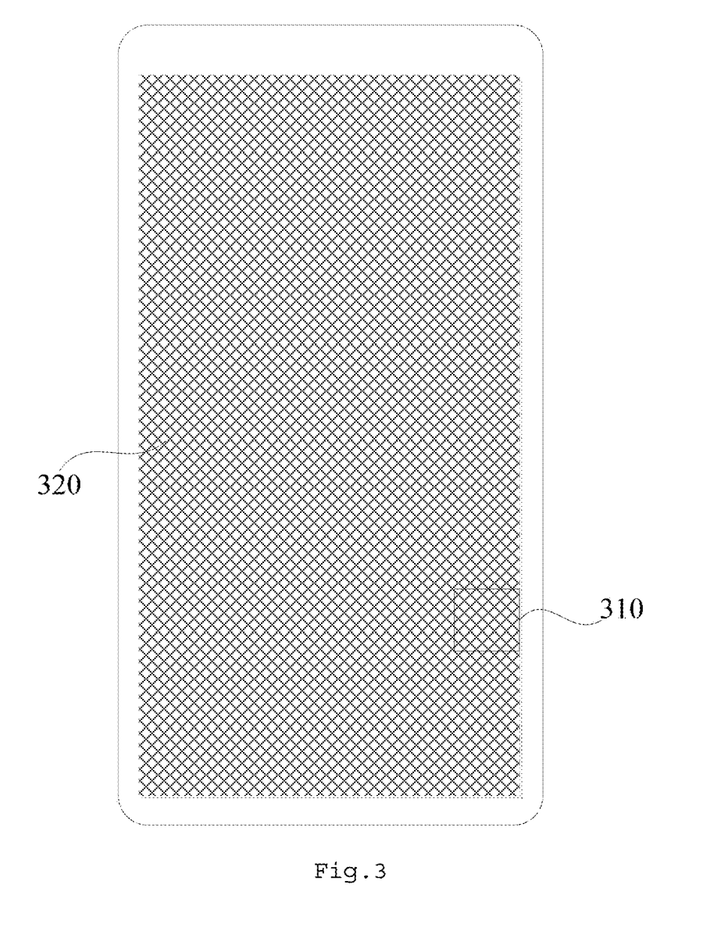
FIG. 3 is a schematic diagram of a video playback interface in an embodiment of the present disclosure.

The second interaction operation may be an operation for commenting on the target video, and the corresponding second interaction content is comment content of the target video. Further, referring to FIG. 3 which shows a schematic diagram of a video playback interface, in the video playback interface, a "comment" control 310 and a target video 320 are presented, and when the user clicks the "comment" control 310, a comment panel (i.e., the display interface for presenting the second interaction content associated with the target video) will be invoked. In this case, the first interaction content (i.e., the duetted video obtained by duetting with the target video) has no intersection with a set of the second interaction content (i.e., the comment content of the target video).

When the first interaction content associated with the target video meets the preset condition, the control of the first interaction content is presented in the display interface of the second interaction content associated with the target video. The preset condition includes: a quantity of all the first interaction content associated with the target video reaching a threshold; or interaction data of at least one of the first interaction content associated with the target video reaching a preset value. Specifically, for example, if first interaction content is a duetted video obtained by duetting with a target video, a preset condition may be a quantity of the duetted video reaching a threshold, or interactive data of at least one duetted video reaching a preset value, the interactive data including like data, comment data, and/or data on the number of shares. Specifically, for example, if the number of likes of at least one duetted video reaches a preset value, or the number of pieces of comment data of at least one duetted video reaches a preset value, or the number of shares of at least one duetted video reaches a preset value, then it is determined that first interaction content associated with a target video meets a preset condition.

According to the information presentation method provided by the embodiment of the present disclosure, when first interaction content associated with a target video meets a preset condition, in response to an operation, which is triggered by a user, for presenting a display interface of second interaction content associated with the target video being received, a control of the first interaction content is presented in the display interface of the second interaction content, so that the purpose of highlighting the control of the first interaction content is achieved, and then it is possible to enter the display interface for presenting the first interaction content or perform the first interaction operation suitable for the target video through the control of the first interaction content can be achieved.

Figure 4:
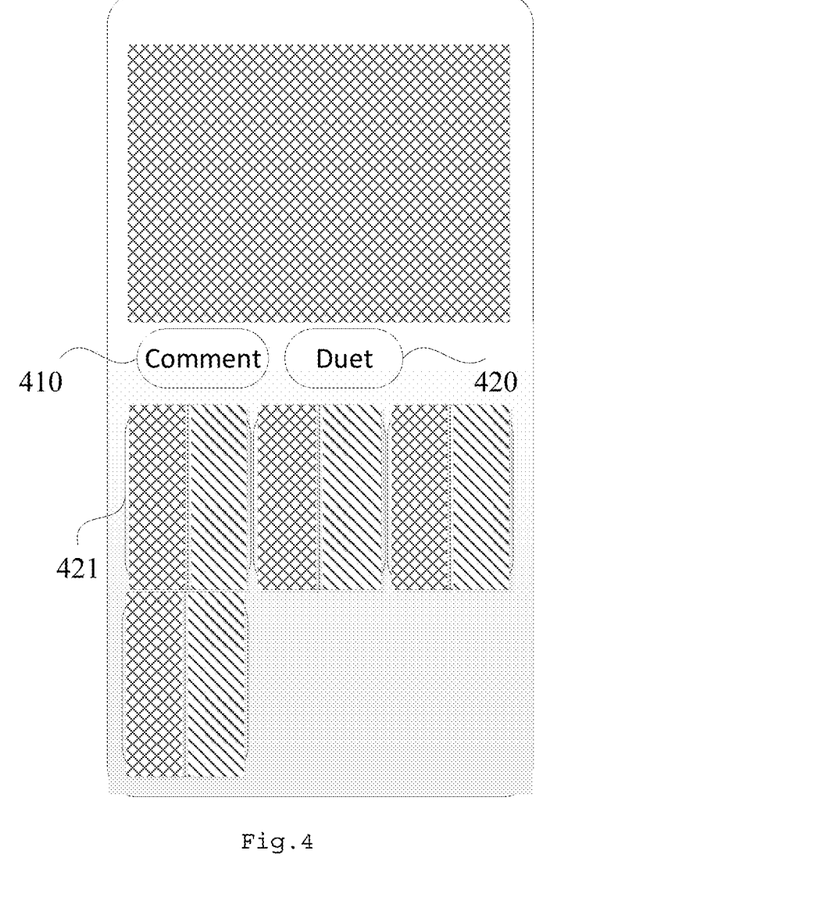
FIG. 4 is a schematic diagram of a display interface for presenting second interaction content associated with a target video in an embodiment of the present disclosure.

Referring to FIG. 4 which shows a schematic diagram of a display interface for presenting second interaction content associated with a target video, a "comment" control 410 and a "duet" control 420 (i.e., the control of the first interaction content) are presented in a comment panel (i.e., the display interface for presenting the second interaction content associated with the target video) of the target video. When the user clicks the "comment" control 410, comment information of the target video is presented in the comment panel. When the user clicks the "duet" control 420, switching will be performed from presenting a comment in the comment panel to presenting a duetted video 421 duetted with the target video, which may be specifically presenting an identification of the duetted video duetted with the target video in the comment panel. The identification may be a video cover.

In general, in response to a triggering on the control 420 of the first interaction content, at least one of the first interaction content (i.e. the duetted video duetted with the target video) is presented. When the user triggers a specific duetted video 421, a playback interface of the triggered duetted video 421 is jumped to, and the "duet" control is presented in the playback interface, to facilitate the user to enter a duetting interface for duetting with the target video based on the playback interface of the duetted video, that is, in response to the triggering on the first interaction content, a presentation interface of the first interaction content is presented.

Figure 5:
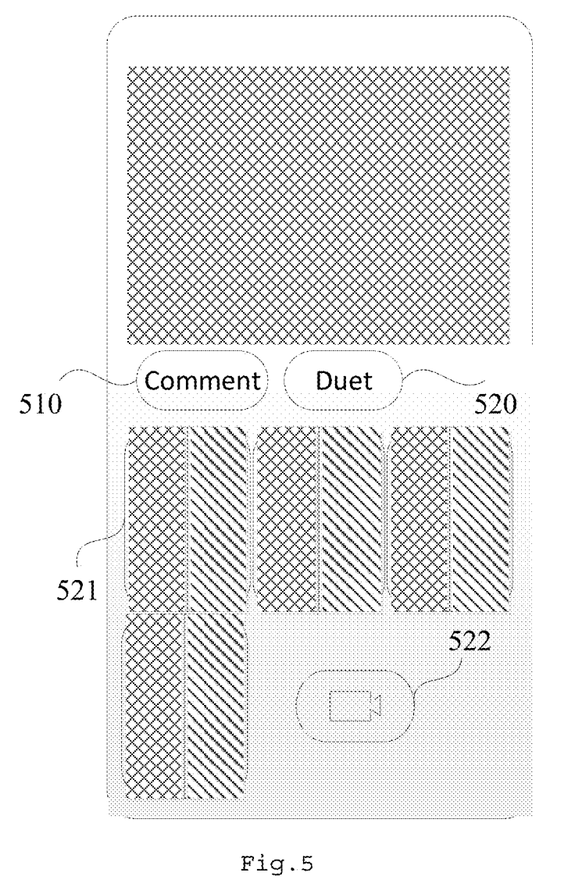
FIG. 5 is a schematic diagram of a display interface for presenting second interaction content associated with a target video in an embodiment of the present disclosure.

Further, in an implementation, referring to FIG. 5 which shows a schematic diagram of a display interface for presenting second interaction content associated with a target video, a "comment" control 510 and a "duet" control 520 (i.e. the control of the first interaction content) are presented in a comment panel (i.e. the display interface for presenting the second interaction content associated with the target video) of the target video. When the user clicks the "comment" control 510, comment information of the target video is presented in the comment panel. When the user clicks the "duet" control 520, a duetted video 521 duetted with the target video and a duetting operation control 522 (i.e., a first interaction control associated with the first interaction operation) are presented in the comment panel. In general, in response to a triggering on the control 520 of the first interaction content, the at least one of the first interaction content and a first interaction control associated with the first interaction operation are presented. When the user triggers the duetting operation control 522, the video shooting interface for duetting with the target video is entered, in which the target video and a real-time portrait of the user are presented. In general, in response to the triggering on the first interaction control, it is switched to an interface for performing the first interaction operation on the target video.

Alternatively, when the user clicks the "duet" control 520, only the duetting operation control 522 (i.e., the first interaction control associated with the first interaction operation) is presented in the comment panel, without presenting the at least one of the first interaction content (i.e., the duetted video 521).

Further, presenting at least one of the first interaction content in a display interface of second interaction content associated with the target video includes: presenting a plurality of identifications of the first interaction content in a preset order. The preset order may be a descending order of heat of respective first interaction content, for example, a duetted video (i.e., the first interaction content) with more likes is presented at an upper left position of a display interface, and a duetted video with fewer likes is presented at a lower right position of the display interface. Otherwise, a duetted video with more comments is presented at an upper left position of a display interface, and a video with fewer comments is presented at a lower right position of the display interface.

Figure 6:
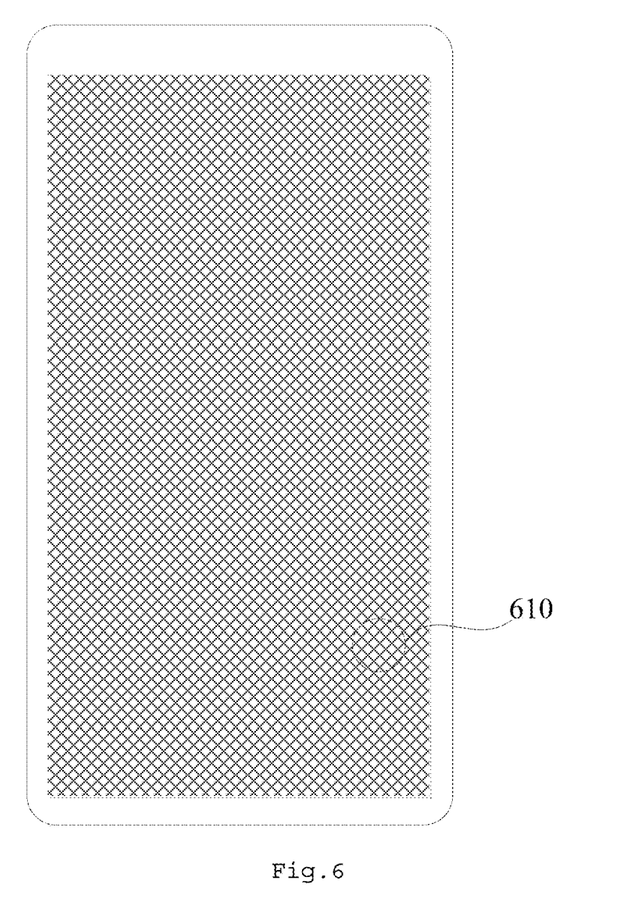
FIG. 6 is a schematic diagram of a playback interface of a target video in an embodiment of the present disclosure.
Figure 7:
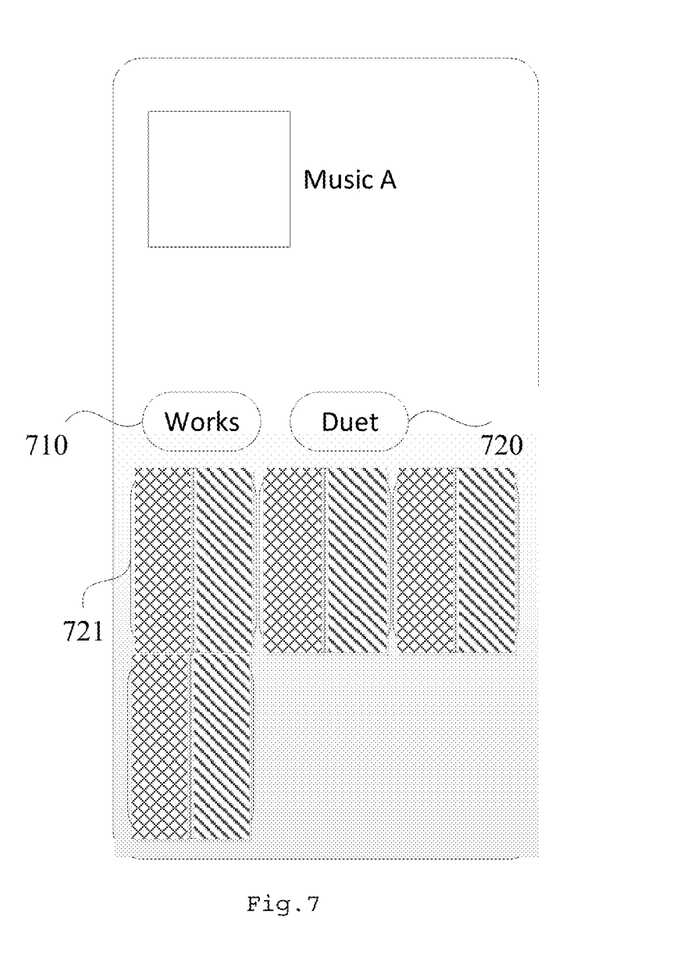
FIG. 7 is a schematic diagram of a background music detail interface of a target video in an embodiment of the present disclosure.

In another implementation, the first interaction operation is duetting, and the first interaction content is a duetted video obtained by duetting with the target video. The second interaction operation is a video shooting operation, and the second interaction content is a video obtained by video shooting with the background music used by the target video as a background music. Referring to FIG. 6 which shows a schematic diagram of a playback interface of a target video, a "music" control 610 is presented in the playback interface of the target video, so that a background music detail interface of the target video can be entered by triggering the "music" control 610. Referring to FIG. 7 which shows a schematic diagram of a background music detail interface of a target video, the background music detail interface of the target video includes a "works" control 710, and in an interface corresponding to the "works" control 710 of the background music detail interface, another video with background music the same as the background music of the target video is presented. In response to the first interaction content associated with the target video meeting the preset condition, for example, a quantity of a duetted video duetted with a target video reaches a threshold, or interaction data of at least one duetted video reaches a preset value, then a "duet" control 720 is further presented in a background music detail interface (that is, in response to the first interaction content associated with the target video meeting the preset condition, the control of the first interaction content is presented in the display interface of the second interaction content associated with the target video), and in response to the "duet" control 720 being triggered, then a duetted video 721 obtained by duetting with the target video is presented in the background music detail interface (that is, at least one of the first interaction content is presented in response to the triggering on the control of the first interaction content). When the user triggers a specific duetted video 721, it jumps to a playback interface of the triggered duetted video 721, and the "duet" control is presented in the playback interface, to enter the duetting interface for duetting with the target video based on the playback interface of the duetted video, that is, a presentation interface of the first interaction content is presented in response to the triggering on the first interaction content. In this scenario, a set of videos under the "duet" control 720 is a subset of a set of videos under the "works" control 710, because both the video under the "duet" control 720 and the video under the "works" control 710 use a background music the same as the background music of the target video. In general, at least one of the first interaction content is a subset of a set of the second interaction content. It can be seen from FIG. 7 that the background music of the target video is music A.

Figure 8:
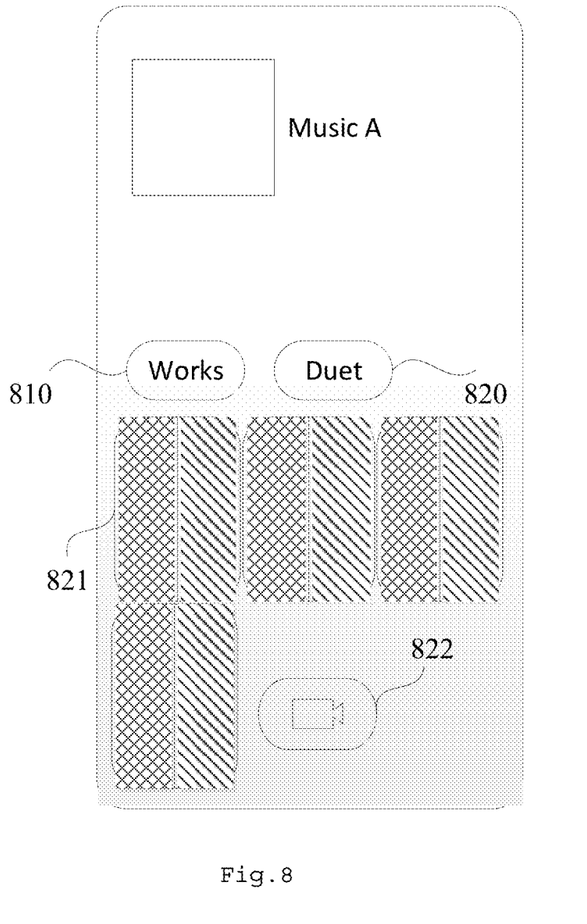
FIG. 8 is a schematic diagram of a background music detail interface of a target video in an embodiment of the present disclosure.

Further, in an implementation, referring to FIG. 8 which shows a schematic diagram of a background music detail interface of a target video, after a "duet" control 820 is triggered, a duetting operation control 822 is also presented in the background music detail interface. When the user triggers the duetting operation control 822, a video shooting interface for duetting with the target video is entered, where the target video and the real-time portrait of the user are presented.

It should be noted that the target video may be a raw video allowing duetting, or a duetted video after duetting once with the raw video allowing duetting, which may be referred to as duetting-once video. The target video may also be a duetting-twice video obtained by duetting with the duetting-once video, a duetting-three-times video obtained by duetting with the duetting-twice video, and the like.

Figure 9:
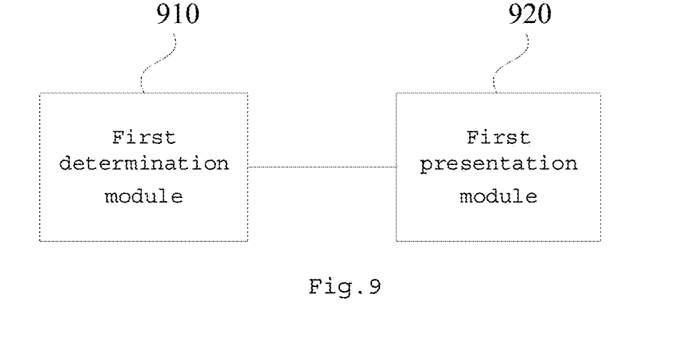
FIG. 9 is a schematic structural diagram of an information presentation apparatus in an embodiment of the present disclosure.

FIG. 9 is a schematic structural diagram of an information presentation apparatus in an embodiment of the present disclosure. As shown in FIG. 9, the information presentation apparatus specifically includes: a first determination module 910 and a first presentation module 920.

The first determination module 910 is configured to, in response to an operation, which is triggered by a user, for presenting a display interface of second interaction content associated with a target video, determine whether first interaction content associated with the target video meets a preset condition; and the first presentation module 920 is configured to, in response to the first interaction content associated with the target video meeting the preset condition, present a control of the first interaction content in the display interface of the second interaction content associated with the target video, wherein the first interaction content is obtained by performing a first interaction operation on the target video, and the second interaction content is obtained by performing a second interaction operation on the target video.

Alternatively, the information presentation apparatus further includes: a second presentation module configured to, in response to a triggering on the control of the first interaction content, present at least one of the first interaction content; and/or a first interaction control associated with the first interaction operation.

Alternatively, the information presentation apparatus further includes: a third presentation module configured to, in response to a triggering on the first interaction content, present a display interface of the first interaction content.

Alternatively, the information presentation apparatus further includes: a switching module configured to, in response to a triggering on the first interaction control, switch to an interface for performing the first interaction operation on the target video.

Alternatively, the second presentation module is specifically configured to: present a plurality of identifications of the first interaction content in a preset order.

Alternatively, the at least one of the first interaction content is a subset of a set of the second interaction content, or the at least one of the first interaction content has no intersection with the set of the second interaction content.

Alternatively, the preset condition includes: a quantity of all the first interaction content associated with the target video reaching a threshold; or interaction data of the at least one of the first interaction content associated with the target video reaching a preset value.

Alternatively, the first interaction content includes a duetted video obtained by duetting with the target video, and the display interface of the second interaction content includes a comment interface of the target video and/or a background music detail interface of the target video.

According to the information presentation apparatus provided in the embodiment of the present disclosure, when first interaction content associated with a target video meets a preset condition, in response to an operation, which is triggered by a user, for presenting a display interface of second interaction content associated with the target video, being received, a control of the first interaction content is presented in the display interface of the second interaction content. The purpose of highlighting the control of the first interaction content is achieved, and then the purpose of guiding the user to enter the interface for presenting the first interaction content or perform the first interaction operation suitable for the target video through the control of the first interaction content can be achieved.

The information presentation apparatus provided in the embodiment of the present disclosure can execute the steps in the information presentation method provided in the embodiment of the present disclosure, and has beneficial effects of the execution of the steps, which are not repeated herein.

Figure 10:
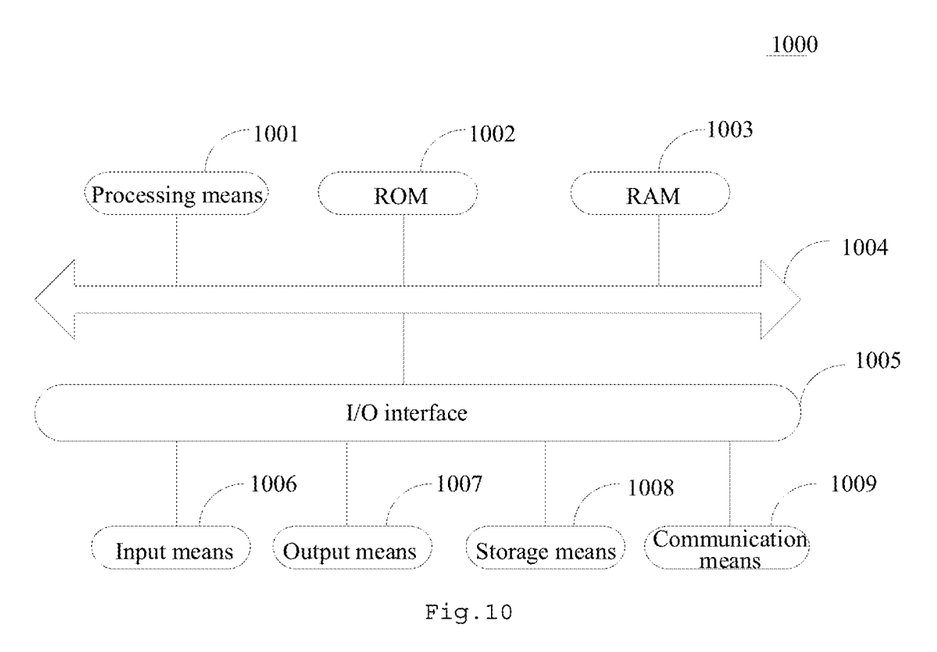
FIG. 10 is a schematic structural diagram of an electronic device in an embodiment of the present disclosure.

FIG. 10 is a schematic structural diagram of an electronic device in an embodiment of the present disclosure. Hereinafter, reference is made specifically to FIG. 10, which shows a schematic structural diagram of an electronic device 1000 suitable for implementing the embodiments of the present disclosure. The electronic device 1000 in the embodiment of the present disclosure may include, but is not limited to, a mobile terminal such as a mobile phone, a notebook computer, a digital broadcast receiver, a PDA (personal digital assistant), a PAD (tablet computer), a PMP (portable multimedia player), a vehicle-mounted terminal (e.g., a vehicle-mounted navigation terminal), and a wearable electronic device, and a fixed terminal such as a digital TV, a desktop computer, and a smart home device. The electronic device shown in FIG. 10 is only an example, and should not bring any limitation to the functions and the scope of usage of the embodiments of the present disclosure.

As shown in FIG. 10, the electronic device 1000 may include a processing means (e.g., a central processing unit, a graphics processing unit, etc.) 1001 that may perform various suitable actions and processes to implement the method according to the embodiments of the present disclosure according to a program stored in a read-only memory (ROM) 1002 or a program loaded from a storage means 1008 into a random access memory (RAM) 1003. In the RAM 1003, various programs and data necessary for the operation of the electronic device 1000 are also stored. The processing means 1001, ROM 1002, and RAM 1003 are connected to each other through a bus 1004. An input/output (I/O) interface 1005 is also connected to the bus 1004.

Generally, the following means may be connected to the I/O interface 1005: an input means 1006 including, for example, a touch screen, touch pad, keyboard, mouse, camera, microphone, accelerometer, gyroscope, and the like; an output means 1007 including, for example, a liquid crystal display (LCD), speaker, vibrator, and the like; a storage means 1008 including, for example, a magnetic tape, hard disk, and the like; and a communication means 1009. The communication means 1009 may allow the electronic device 1000 to communicate wirelessly or by wire with other devices to exchange data. While FIG. 10 illustrates the electronic device 1000 having various means, it is should be understood that not all illustrated means are required to be implemented or provided. More or fewer means may be alternatively implemented or provided.

In particular, according to the embodiment of the present disclosure, the processes described above with reference to the flow diagrams may be implemented as a computer software program. For example, the embodiment of the present disclosure includes a computer program product, the computer program product including a computer program carried on a non-transitory computer-readable medium, the computer program containing program code for performing the method illustrated by the flow diagrams, thereby implementing the method as described above. In such an embodiment, the computer program may be downloaded and installed from a network via the communication means 1009, or installed from the storage means 1008, or installed from the ROM 1002. The computer program, when executed by the processing means 1001, performs the above functions defined in the method of the embodiment of the present disclosure.

It should be noted that the above computer-readable medium of the present disclosure may be a computer-readable signal medium or a computer-readable storage medium or any combination of the above two. The computer-readable storage medium may be, for example, but is not limited to, an electronic, magnetic, optical, electromagnetic, infrared, or semiconductor system, apparatus, or device, or any combination of the foregoing. More specific examples of the computer-readable storage medium may include, but are not limited to: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. In the present disclosure, the computer-readable storage medium may be any tangible medium containing or storing a program, wherein the program can be used by or in conjunction with an instruction execution system, apparatus, or device. However, in the present disclosure, the computer-readable signal medium may include a data signal propagated in baseband or as part of a carrier wave, in which computer-readable program code is carried. Such a propagated data signal may take a variety of forms, including, but not limited to, an electromagnetic signal, optical signal, or any suitable combination of the forgoing. The computer-readable signal medium may also be any computer-readable medium other than the computer-readable storage medium, wherein the computer-readable signal medium can send, propagate, or transmit a program for use by or in conjunction with an instruction execution system, apparatus, or device. The program code contained on the computer-readable medium may be transmitted using any appropriate medium, including but not limited to: a wire, an optical cable, RF (Radio Frequency), etc., or any suitable combination of the foregoing.

In some implementations, a client and a server may communicate using any currently known or future developed network protocol, such as HTTP (HyperText Transfer Protocol), and may be interconnected with any form or medium of digital data communication (e.g., a communication network). Examples of the communication network include a local area network ("LAN"), a wide area network ("WAN"), an internet (e.g., the Internet), and a peer-to-peer network (e.g., an ad hoc peer-to-peer network), as well as any currently known or future developed network.

The above computer-readable medium may be contained in the above electronic device; or may be exist separately without being assembled into the electronic device.

The above computer-readable medium has one or more programs carried thereon, wherein the above one or more programs, when executed by the electronic device, cause the electronic device to:

in response to an operation, which is triggered by a user, for presenting a display interface of second interaction content associated with a target video, determine whether first interaction content associated with the target video meets a preset condition; and in response to the first interaction content associated with the target video meeting the preset condition, present a control of the first interaction content in the display interface of the second interaction content associated with the target video, wherein the first interaction content is obtained by performing a first interaction operation on the target video, and the second interaction content is obtained by performing a second interaction operation on the target video.

Alternatively, when the above one or more programs are executed by the electronic device, the electronic device may further perform other steps described in the above embodiments.

Computer program code for performing the operation of the present disclosure may be written in one or more programming languages or a combination thereof, wherein the above programming language includes but is not limited to an object-oriented programming language such as Java, Smalltalk, and C++, and also includes a conventional procedural programming language, such as the "C" programming language or a similar programming language. The program code may be executed entirely on a user's computer, partly on the user's computer, as a stand-alone software package, partly on the user's computer and partly on a remote computer, or entirely on the remote computer or server. In a scenario where the remote computer is involved, the remote computer may be connected to the user's computer through any type of network, including a local area network (LAN) or a wide area network (WAN), or may be connected to an external computer (for example, through the Internet using an Internet service provider).

The flow diagrams and block diagrams in the drawings illustrate the possibly implemented architecture, functions, and operations of the system, method and computer program product according to various embodiments of the present disclosure. In this regard, each block in the flow diagrams or block diagrams may represent a module, program segment, or portion of code, which includes one or more executable instructions for implementing a specified logical function. It should also be noted that, in some alternative implementations, functions noted in blocks may occur in a different order from those noted in the drawings. For example, two blocks shown in succession may, in fact, be executed substantially concurrently, or the blocks may sometimes be executed in a reverse order, which depends upon the functions involved. It will also be noted that each block in the block diagrams and/or flow diagrams, and a combination of the blocks in the block diagrams and/or flow diagrams, can be implemented by a special-purpose hardware-based system that performs specified functions or operations, or a combination of special-purpose hardware and computer instructions.

The involved unit described in the embodiments of the present disclosure may be implemented in software or hardware. The name of the unit does not, in some cases, constitute a limitation on the unit itself.

The functions described above herein may be executed, at least partially, by one or more hardware logic components. For example, without limitation, exemplary types of the hardware logic component that may be used include: a field programmable gate array (FPGA), application specific integrated circuit (ASIC), application specific standard product (ASSP), system on chip (SOC), complex programmable logic device (CPLD), and the like.

In the context of this disclosure, a machine-readable medium may be a tangible medium, which can contain, or store a program for use by or in conjunction with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the foregoing. More specific examples of the machine-readable storage medium include an electrical connection based on one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing.

According to one or more embodiments of the present disclosure, it provides an information presentation method, including: in response to an operation, which is triggered by a user, for presenting a display interface of second interaction content associated with a target video, determining whether first interaction content associated with the target video meets a preset condition; and in response to the first interaction content associated with the target video meeting the preset condition, presenting a control of the first interaction content in the display interface of the second interaction content associated with the target video, wherein the first interaction content is obtained by performing a first interaction operation on the target video, and the second interaction content is obtained by performing a second interaction operation on the target video.

According to one or more embodiments of the present disclosure, in the information presentation method provided in the present disclosure, alternatively, the method further includes: in response to a triggering on the control of the first interaction content, presenting at least one of the first interaction content; and/or a first interaction control associated with the first interaction operation.

According to one or more embodiments of the present disclosure, in the information presentation method provided in the present disclosure, alternatively, the method further includes: in response to a triggering on the first interaction content, presenting a display interface of the first interaction content; and/or in response to a triggering on the first interaction control, switching to an interface for performing the first interaction operation on the target video.

According to one or more embodiments of the present disclosure, in the information presentation method provided in the present disclosure, alternatively, the presenting at least one of the first interaction content includes presenting a plurality of identifications of the first interaction content in a preset order.

According to one or more embodiments of the present disclosure, in the information presentation method provided in the present disclosure, alternatively, the at least one of the first interaction content is a subset of a set of the second interaction content, or the at least one of the first interaction content has no intersection with the set of the second interaction content.

According to one or more embodiments of the present disclosure, in the information presentation method provided in the present disclosure, alternatively, the preset condition includes: a quantity of all the first interaction content associated with the target video reaching a threshold; or interaction data of the at least one of the first interaction content associated with the target video reaching a preset value.

According to one or more embodiments of the present disclosure, in the information presentation method provided in the present disclosure, alternatively, the first interaction content includes a duetted video obtained by duetting with the target video, and the display interface of the second interaction content includes a comment interface of the target video and/or a background music detail interface of the target video.

According to one or more embodiments of the present disclosure, it provides an information presentation apparatus, including: a first determination module configured to, in response to an operation, which is triggered by a user, for presenting a display interface of second interaction content associated with a target video, determine whether first interaction content associated with the target video meets a preset condition; and a first presentation module configured to, in response to the first interaction content associated with the target video meeting the preset condition, present a control of the first interaction content in the display interface of the second interaction content associated with the target video, wherein the first interaction content is obtained by performing a first interaction operation on the target video, and the second interaction content is obtained by performing a second interaction operation on the target video.

According to one or more embodiments of the present disclosure, in the information presentation apparatus provided in the present disclosure, alternatively, the apparatus further includes: a second presentation module configured to, in response to a triggering on the control of the first interaction content, present at least one of the first interaction content; and/or a first interaction control associated with the first interaction operation.

According to one or more embodiments of the present disclosure, in the information presentation apparatus provided in the present disclosure, alternatively, the apparatus further includes: a third presentation module configured to, in response to a triggering on the first interaction content, present a display interface of the first interaction content.

According to one or more embodiments of the present disclosure, in the information presentation apparatus provided in the present disclosure, alternatively, the apparatus further includes: a switching module configured to, in response to a triggering on the first interaction control, switch to an interface for performing the first interaction operation on the target video.

According to one or more embodiments of the present disclosure, in the information presentation apparatus provided in the present disclosure, alternatively, the second presentation module is specifically configured to: present a plurality of identifications of the first interaction content in a preset order.

According to one or more embodiments of the present disclosure, in the information presentation apparatus provided in the present disclosure, alternatively, the at least one of the first interaction content is a subset of a set of the second interaction content, or the at least one first interaction content has no intersection with the set of the second interaction content.

According to one or more embodiments of the present disclosure, in the information presentation apparatus provided in the present disclosure, alternatively, the preset condition includes: a quantity of all the first interaction content associated with the target video reaching a threshold; or interaction data of the at least one of the first interaction content associated with the target video reaching a preset value.

According to one or more embodiments of the present disclosure, in the information presentation apparatus provided in the present disclosure, alternatively, the first interaction content includes a duetted video obtained by duetting with the target video, and the display interface of the second interaction content includes a comment interface of the target video and/or a background music detail interface of the target video.

According to one or more embodiments of the present disclosure, it provides an electronic device, including:
one or more processors; and
a memory for storing one or more programs,
wherein the one or more programs, when executed by the one or more processors, cause the one or more processors to implement any of the information presentation methods provided in the present disclosure.

According to one or more embodiments of the present disclosure, it provides a computer-readable storage medium having thereon stored a computer program which, when executed by a processor, implements any of the information presentation methods provided in the present disclosure.

The embodiments of the present disclosure further provide a computer program product including a computer program or instructions which, when executed by a processor, implement the information presentation method as described above.

The foregoing only describes the preferred embodiments of the present disclosure and an explanation of the technical principles employed. It should be appreciated by those skilled in the art that the disclosure scope involved in the present disclosure is not limited to the technical solutions formed by specific combinations of the technical features described above, but also encompasses other technical solutions formed by arbitrary combinations of the above technical features or equivalent features thereof without departing from the above disclosed concepts, for example, a technical solution formed by performing mutual replacement between the above features and technical features having similar functions to those disclosed (but not limited to) in the present disclosure.

Furthermore, while operations are depicted in a specific order, this should not be understood as requiring that these operations be performed in the specific order shown or in a sequential order. Under certain circumstances, multitasking and parallel processing might be advantageous. Similarly, while several specific implementation details are included in the above discussion, these should not be construed as limitations on the scope of the present disclosure. Certain features that are described in the context of separate embodiments may also be implemented in combination in a single embodiment. Conversely, various features that are described in the context of a single embodiment may also be implemented in multiple embodiments separately or in any suitable sub-combination.

Although the subject matter has been described in language specific to structural features and/or method logical actions, it should be understood that the subject matter defined in the attached claims is not necessarily limited to the specific features or actions described above. Rather, the specific features and actions described above are only example forms of implementing the claims.

What is claimed is:

1. An information presentation method, comprising:
in response to an operation for presenting a display interface of second interaction content associated with a target video, determining whether first interaction content associated with the target video meets a preset condition; and
in response to the first interaction content associated with the target video meeting the preset condition, presenting a control of the first interaction content in the display interface of the second interaction content associated with the target video,
wherein the first interaction content is obtained by performing a first interaction operation on the target video, and the second interaction content is obtained by performing a second interaction operation on the target video.

2. The method according to claim 1, further comprising:
in response to a triggering on the control of the first interaction content, presenting at least one of one or more of the first interaction content or a first interaction control associated with the first interaction operation.

3. The method according to claim 2, wherein the in response to a triggering on the control of the first interaction content, presenting at least one of the first interaction content further comprises at least one of:

in response to the triggering on the control of the first interaction content, presenting a display interface of the first interaction content; or
in response to the triggering on the control of the first interaction control, presenting an interface for performing the first interaction operation on the target video.

4. The method according to claim 2, wherein the presenting at least one of the first interaction content comprises presenting a plurality of identifications of the first interaction content in a preset order.

5. The method according to claim 2, wherein the at least one of the first interaction content is a subset of a set of the second interaction content, or the at least one of the first interaction content has no intersection with the set of the second interaction content.

6. The method according to claim 1, wherein the preset condition comprises at least one of: a quantity of all the first interaction content associated with the target video reaching a threshold or interaction data of the at least one of the first interaction content associated with the target video reaching a preset value.

7. The method according to claim 1, wherein the first interaction content comprises a duetted video obtained by duetting with the target video, and the display interface of the second interaction content comprises at least one of a comment interface of the target video or a background music detail interface of the target video.

8. An electronic device, comprising:
one or more processors;
storage means configured to store one or more programs,
wherein the one or more programs, when executed by the one or more processors, cause the one or more processors to:
in response to an operation, which is triggered by a user, for presenting a display interface of second interaction content associated with a target video, determine whether first interaction content associated with the target video meets a preset condition; and
in response to the first interaction content associated with the target video meeting the preset condition, present a control of the first interaction content in the display interface of the second interaction content associated with the target video,
wherein the first interaction content is obtained by performing a first interaction operation on the target video, and the second interaction content is obtained by performing a second interaction operation on the target video.

9. The electronic device according to claim 8, wherein the one or more programs, when executed by the one or more processors, further cause the one or more processors to:
in response to a triggering on the control of the first interaction content, present at least one of at least one of the first interaction content or a first interaction control associated with the first interaction operation.

10. The electronic device according to claim 9, wherein the one or more programs, when executed by the one or more processors, further cause the one or more processors to perform at least one of:
in response to a triggering on the control of the first interaction content, present a display interface of the first interaction content; or
in response to a triggering on the control of the first interaction control, presenting an interface for performing the first interaction operation on the target video.

11. The electronic device according to claim 9, wherein the one or more programs, when executed by the one or more processors, further cause the one or more processors to:
    present a plurality of identifications of the first interaction content in a preset order.

12. The electronic device according to claim 9, wherein the at least one of the first interaction content is a subset of a set of the second interaction content, or the at least one of the first interaction content has no intersection with the set of the second interaction content.

13. The electronic device according to claim 8, wherein the preset condition comprises at least one of: a quantity of all the first interaction content associated with the target video reaching a threshold or interaction data of the at least one of the first interaction content associated with the target video reaching a preset value.

14. The electronic device according to claim 8, wherein the first interaction content comprises a duetted video obtained by duetting with the target video, and the display interface of the second interaction content comprises at least one of a comment interface of the target video or a background music detail interface of the target video.

15. A non-transitory computer-readable storage medium, having thereon stored a computer program which, when executed by a processor, performs:
    in response to an operation, which is triggered by a user, for presenting a display interface of second interaction content associated with a target video, determine whether first interaction content associated with the target video meets a preset condition; and
    in response to the first interaction content associated with the target video meeting the preset condition, present a control of the first interaction content in the display interface of the second interaction content associated with the target video,
    wherein the first interaction content is obtained by performing a first interaction operation on the target video, and the second interaction content is obtained by performing a second interaction operation on the target video.

16. The non-transitory computer-readable storage medium according to claim 15, wherein the computer program which, when executed by a processor, further performs:
    in response to a triggering on the control of the first interaction content, present at least one of at least one of the first interaction content or a first interaction control associated with the first interaction operation.

17. The non-transitory computer-readable storage medium according to claim 16, wherein the computer program which, when executed by a processor, further performs at least one of:
    in response to a triggering on the control of the first interaction content, present a display interface of the first interaction content; or
    in response to a triggering on the control of the first interaction control, presenting an interface for performing the first interaction operation on the target video.

18. The non-transitory computer-readable storage medium according to claim 16, wherein the computer program which, when executed by a processor, further performs:
    present a plurality of identifications of the first interaction content in a preset order.

19. The non-transitory computer-readable storage medium according to claim 16, wherein the at least one of the first interaction content is a subset of a set of the second interaction content, or the at least one of the first interaction content has no intersection with the set of the second interaction content.

20. The non-transitory computer-readable storage medium according to claim 15, wherein the preset condition comprises at least one of: a quantity of all the first interaction content associated with the target video reaching a threshold or interaction data of the at least one of the first interaction content associated with the target video reaching a preset value.

* * * * *